United States Patent
Makita

[11] Patent Number: 5,112,077
[45] Date of Patent: May 12, 1992

[54] SUSPENSION SYSTEM

[75] Inventor: Naoki Makita, Kanagawa, Japan

[73] Assignee: Tokico Ltd., Kanagawa, Japan

[21] Appl. No.: 643,946

[22] Filed: Jan. 22, 1991

[30] Foreign Application Priority Data

Jan. 20, 1990 [JP] Japan .................. 2-4231[U]

[51] Int. Cl.5 .............................................. B60G 11/48
[52] U.S. Cl. ..................................... 280/673; 267/220; 280/692
[58] Field of Search ............... 280/691, 693, 696, 698, 280/701, 716, 724, 660, 668, 670, 673, 692; 267/220, 33

[56] References Cited

U.S. PATENT DOCUMENTS 4,497,523  2/1985  Lederman .................... 280/673
4,877,262 10/1989  Tanahashi et al. ............ 280/673

FOREIGN PATENT DOCUMENTS 1-186409  7/1989  Japan .
1-186410  7/1989  Japan .
2625950   7/1989  Japan ....................... 280/668

Primary Examiner—Charles A. Marmor
Assistant Examiner—Tomara L. Finlay
Attorney, Agent, or Firm—Wenderoth, Lind & Ponack

[57] ABSTRACT

A suspension system includes a shock absorber body, a piston rod that projects upwardly from the upper end of the shock absorber body, and a mount that is provided on the projecting end portion of the piston rod to attach the projecting end portion to a vehicle body. The mount includes a first mounting member that is attached to the piston rod, a second mounting member that is attached to the vehicle body, and a rubber mount member that is provided between the first and second mounting members. The rubber mount member has a pair of thick- and thin-walled diametrically opposing portions. The suspension system further includes engagement members to which a retainer is disengageably attached to retain the thick-walled portion of the rubber mount member in a compressed state.

8 Claims, 3 Drawing Sheets

SUSPENSION SYSTEM

BACKGROUND OF THE INVENTION

1. Field of the Invention

The present invention relates to a suspension system which is suitable for use, for example, in vehicles.

2. Description of the Prior Art

FIGS. 1 and 2 show an air suspension as one example of suspension systems according to the prior art.

In the figures, reference numeral 1 denotes an outer cylinder that constitutes a shock absorber body. An inner cylinder 2 is coaxially provided inside the outer cylinder 1. The upper end of the outer cylinder 1 is closed with a rod guide 3 and a cap 4, and the lower end is closed with a base cap (not shown). A piston rod 5 projects upwardly from the inner cylinder 2 through the rod guide 3 and the cap 4. The lower end of the piston rod 5 is rigidly secured to a piston (not shown) that is slidably fitted in the inner cylinder 2. The projecting end of the piston rod 5 is attached to a mount 17 (described later) through a nut 6, for example, so that the piston rod 5 extends from and withdraws into the outer cylinder 1 in response to vibration of the vehicle.

An upper shell 7, which is in the shape of a tube one end of which is closed, is rigidly secured to the projecting end portion of the piston rod 5 through the nut 6. A lower shell 8 is rigidly secured to the open end of the upper shell 7 by means, for example, of welding. The lower portion of the lower shell 8 is defined as a reduced-diameter portion 8A which extends to the periphery of the shock absorber body. A tubular member 9 is rigidly secured to the outer periphery of the intermediate portion of the outer cylinder 1. A rubber tube 10 has an inner wall and an outer wall, which are connected together at the respective lower ends thereof by a U-shaped portion. The inner and outer walls of the rubber tube 10 are rigidly secured to the upper end portion of the tubular member 9 and the lower end portion of the lower shell 8, respectively, in such a manner that no air will leak through the joints. Thus, an air chamber 11 is defined between the outer cylinder 1 and the projecting end portion of the piston rod 5. Compressed air is externally supplied into and discharged from the air chamber 11 through an air supply and discharge valve 12. Thus, the air chamber 11 functions as an air spring that constantly biases the piston rod 5 in a direction in which it is extended.

A height sensor 13 is secured to the upper shell 7 inside the air chamber 11. The height sensor 13 has a plurality of reed switches (not shown) which are vertically spaced at predetermined intervals. Each reed switch is turned on/off by a magnet 14 that is attached to the upper end portion of the tubular member 9. More specifically, when the upper shell 7 moves up and down relative to the outer cylinder 1, together with the piston rod 5, the height sensor 13 moves relative to the magnet 14, so that the reed switches come close to or away from the magnet 14 to turn on or off, thus sequentially outputting vehicle level detecting signals through a lead wire 15.

A mounting bracket 16 is provided on the lower end of the outer cylinder 1 to secure the outer cylinder 1 to a member that is provided on an axle of the vehicle, for example, a combination of a knuckle bracket 21 and a knuckle spindle 23, which will be described later.

Reference numeral 17 denotes a mount that is provided on the projecting end portion of the piston rod 5. The mount 17 comprises a piston rod-side mounting member 17A that is secured to the projecting end portion of the piston rod 5 through a bearing 18, a vehicle body-side mounting member 17B that is attached through bolts 19 to a member that is provided on the vehicle body, for example, a strut tower 20, described later, and a rubber annular mount member 17C that is rigidly secured to the mounting members 17A and 17B by means, for example, of baking to resiliently support the piston rod 5 with respect to the vehicle body through the mounting members 17A and 17B. The wall thickness of the rubber mount member 17C gradually changes in the circumferential direction to form a thick-walled portion $17C_1$ and a thin-walled portion $17C_2$, which oppose each other diametrically. The mounting member 17B of the mount 17 has a plurality of bolts 19 which are rigidly secured thereto to secure the mounting member 17B to the strut tower 20 (described later). When the mount 17 is attached in this way, the thick-walled portion $17C_1$ of the mount rubber 17C is strongly compressed and elastically deformed, causing a moment to act on the piston rod 5 in the direction of the arrow B.

The bearing 18 has its inner ring rigidly secured to the projecting end portion of the piston rod 5 through the nut 6 and its outer ring rigidly secured to the mounting member 17A of the mount 17 by means, for example, of welding. When the piston rod 5 receives a turning force from the outer cylinder 1 due to the reason described later, the bearing 18 allows the piston rod 5 to rotate relative to the vehicle body. At this time, the mount 17 will not rotate because the mounting member 17A is rigidly secured to the outer ring of the bearing 18 and the mounting member 17B to the vehicle body. However, since the upper and lower shells 7 and 8 are secured to the inner ring, together with the piston rod 5, the shells 7 and 8 rotate relative to the vehicle body, together with the piston rod 5, and they can follow the rotation of the outer cylinder 1, together with the tubular member 9 and the rubber tube 10.

Reference numeral 20 denotes a strut tower that constitutes a part of the vehicle body at a position which is closer to a front wheel of the vehicle. To the strut tower 20 is attached the projecting end of the piston rod 5 through the mount 17. Reference numeral 21 denotes a knuckle bracket on the axle, to which the mounting bracket 16 is attached through bolts 22. A knuckle spindle 23 is provided on the knuckle bracket 21 as an integral part thereof, and a front wheel 24 of the vehicle is rotatably attached to the knuckle spindle 23. The front wheel 24 is connected to a steering wheel (not shown) of the vehicle through a lever 25 that is integrally provided on the knuckle bracket 21, so that the front wheel 24 can be steered by the steering wheel.

When the suspension system of the prior art, having the above-described arrangement, is used for supporting a front wheel of a vehicle, as shown in FIG. 2, the mounting bracket 16 is secured to the knuckle bracket 21 for the front wheel through the bolts 22, and the mount 17 is secured to the strut tower 20 of the vehicle body above the front wheel through the bolts 19. At this time, the thick-walled portion $17C_1$ of the mount rubber 17C of the mount 17 is compressed by externally applying a load thereto so that it is deformed from the shape that is shown in FIG. 1 into the shape shown in FIG. 2. As a result, the thickness of the thick-walled portion $17C_1$ becomes substantially the same as that of the thin-walled portion $17C_2$. Then, compressed air is supplied into the air chamber 11 according to the vehicle level detecting signal from the height sensor 13, thereby adjusting the level of the vehicle and constantly biasing the piston rod 5 in a direction in which it is extended, and thus supporting the vehicle body on the axle through the suspension system.

When vibration is applied to the vehicle when running on a rough road, the piston rod 5 extends and contracts. In consequence, the piston slides inside the inner cylinder 2, thereby generating a damping force by the action of oil in the inner and outer cylinders 2 and 3, and thus absorbing the vibration. On the other hand, when a turning force is applied to the outer cylinder 1 through the mounting bracket 16 by steering the front wheel, since both the piston rod 5 and the upper shell 7 are rotatable relative to the vehicle body by means of the bearing 18, as described above, the piston rod 5, the upper shell 7 and the rubber tube 10 rotate together with the outer cylinder 1, thereby preventing the application of a torsional load to the rubber tube 10.

Since the outer cylinder 1 is attached to the front wheel of the vehicle through the mounting bracket 16, the outer cylinder 1 is subjected to a moment in the direction of the arrow A by the tire reaction of the front wheel, and this moment would tend to cause the piston rod 5 and the outer cylinder 1 to locally push each other extremely strongly through the rod guide 3, so that abnormal friction would likely occur between the rod guide 3 and the piston rod 5.

However, since the projecting end portion of the piston rod 5 is attached to the vehicle body through the mount 17, and the thick-walled portion $17C_1$ of the rubber mount member 17C of the mount 17 is attached to the vehicle body in an elastically compressed state, as shown in FIG. 2, a moment in the direction of the arrow B can be applied to the upper end portion of the shock absorber body, for example, the piston rod 5, by the elastically deformed rubber mount member 17C, so that the moment in the direction of the arrow A that is generated by the above-described tire reaction can be canceled by the moment in the direction of the arrow B, thus preventing the occurrence of abnormal friction between the piston rod 5 and the rod guide 3.

The above-described prior art suffers, however, from the problems that, when the suspension system is to be attached to a vehicle, the rubber mount member 17C of the mount 17 must be compressed by externally applying a load thereto so that the thickness of the thick-walled portion $17C_1$ becomes substantially the same as that of the thin-walled portion $17C_2$, and the mounting operation, which is conducted with the rubber mount member 17C being compressed, is therefore extremely difficult and hence extra time and labor are consumed in mounting the suspension system onto the vehicle.

SUMMARY OF THE INVENTION

In view of the above-described problems of the prior art, it is an object of the present invention to provide a suspension system which can be attached to a vehicle with the thick-walled portion of the mount rubber being kept in a previously compressed state, thereby improving the operating efficiency.

To this end, the present invention provides a suspension system wherein a retainer is disengageably provided between an engagement member that is provided on the projecting end portion of the piston rod and a mounting member of the mount that is attached to the vehicle body, the retainer retaining the mount rubber in a state where the thick-walled portion thereof is compressed to a thickness which is close to the thickness of the thin-walled portion thereof.

By virtue of the above-described arrangement, the rubber mount member of the mount can be held in a state where the thick-walled portion is compressed to a thickness which is close to the thickness of the thin-walled portion of the suspension system is mounted to a vehicle so that the suspension system can be mounted without the need for compressing the rubber mount member during the mounting operation.

BRIEF DESCRIPTION OF THE DRAWINGS

The above and other objects, features and advantages of the present invention will become more apparent from the following description of the preferred embodiments thereof, taken in conjunction with the accompanying drawings, in which.

DETAILED DESCRIPTION OF THE PREFERRED EMBODIMENTS

Figure 1:
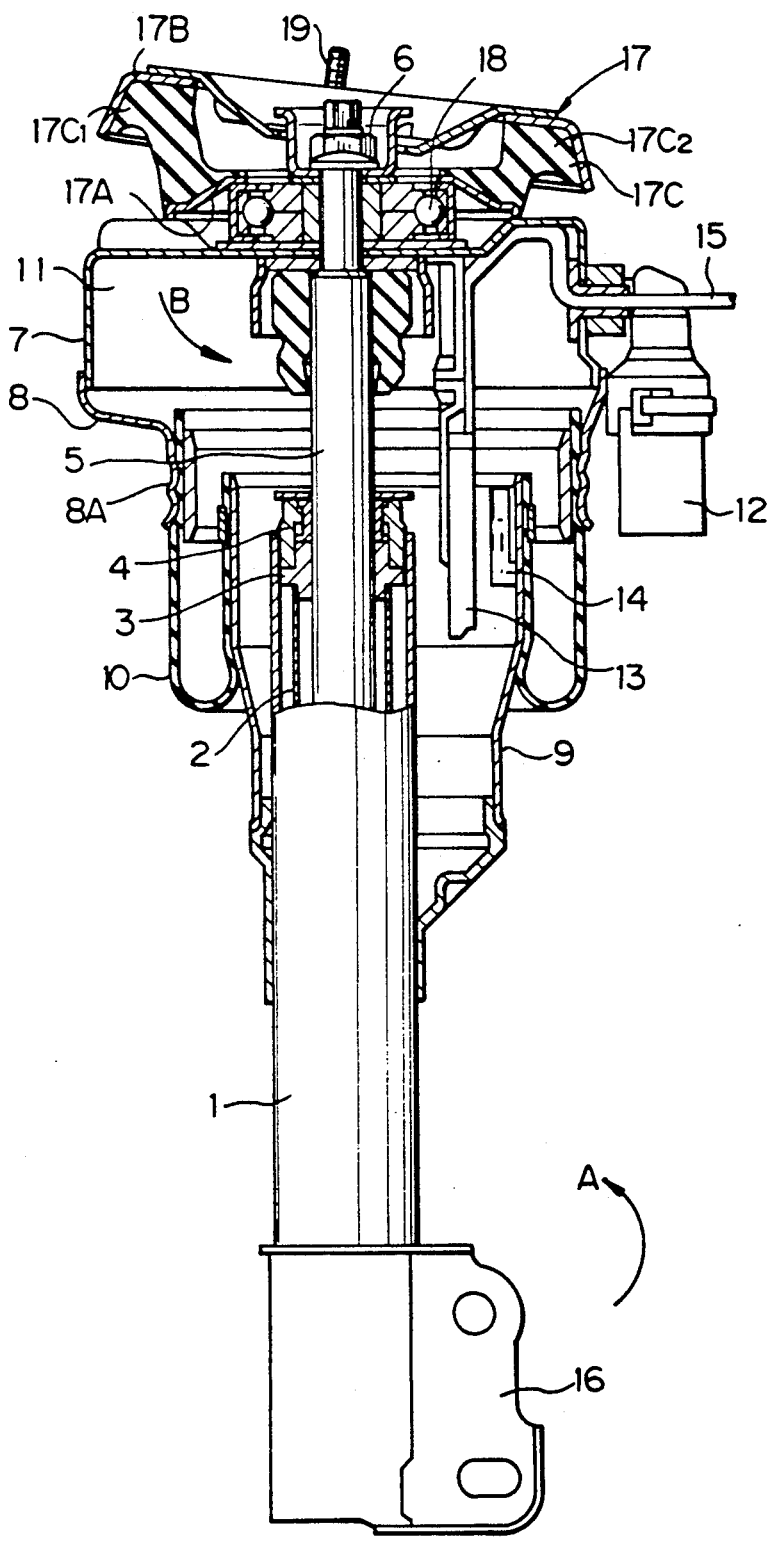
FIG. 1 is a sectional view of a suspension system according to the prior art.
Figure 2:
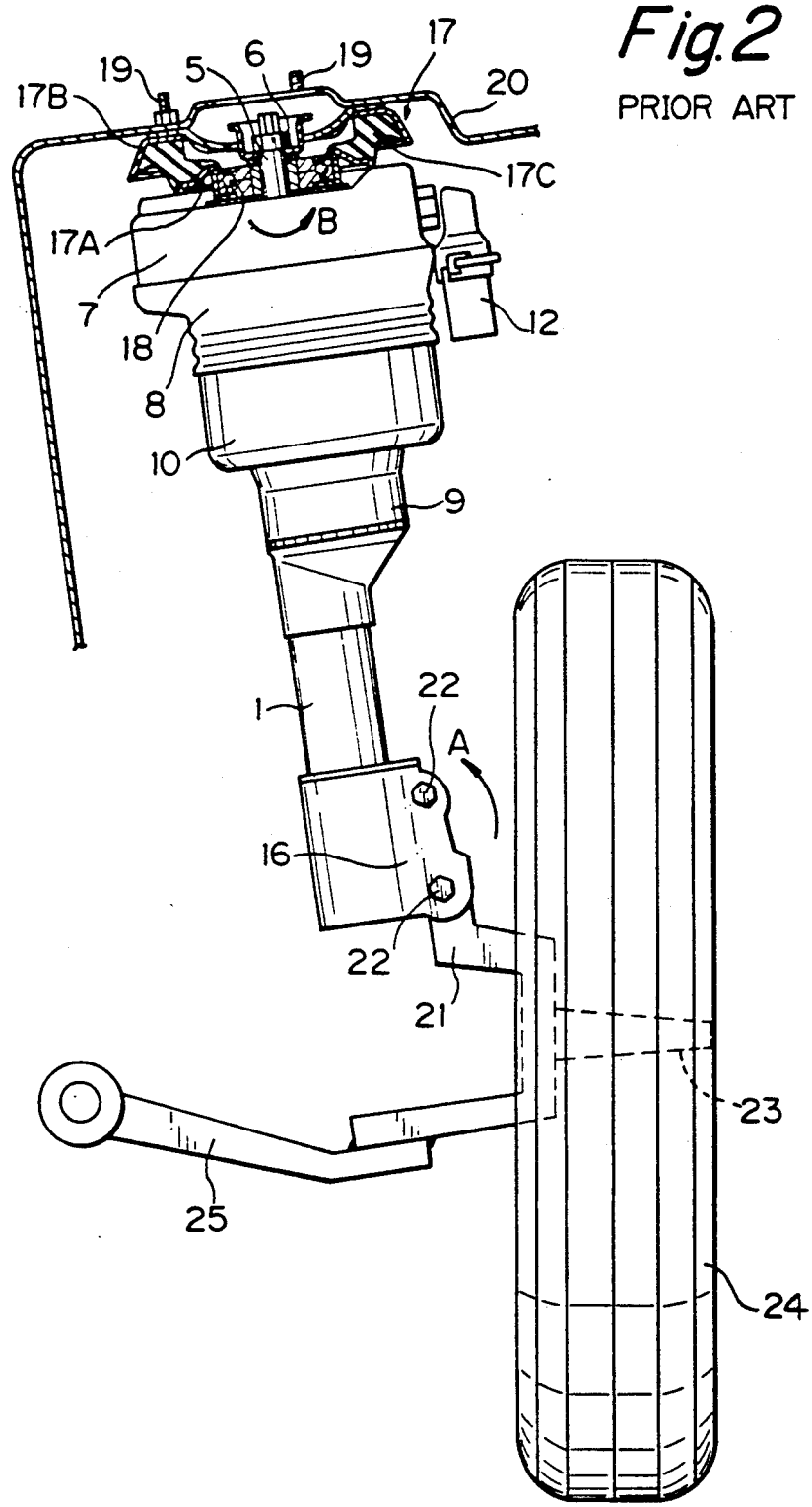
FIG. 2 is a fragmentary sectional view of the prior art suspension system which is attached to a vehicle.

Embodiments of the present invention will be described below with reference to FIGS. 3 and 4. It should be noted that in these embodiments the same constituent elements as those in the prior art shown in FIGS. 1 and 2 are denoted by the same reference numerals, and a detailed description thereof is omitted.

Figure 3:
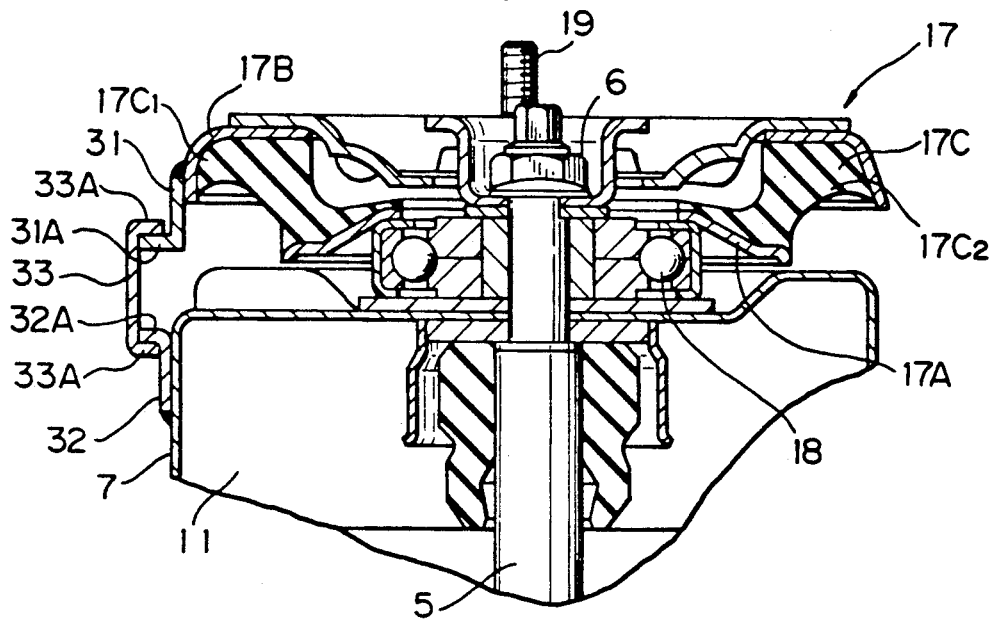
FIG. 3 is a fragmentary sectional view of a first embodiment of the suspension system according to the present invention.

Referring to FIG. 3, which shows a first embodiment of the present invention, reference numeral 31 denotes an engagement member that is rigidly secured by means, for example, of welding to the mounting member 17B of the mount 17 that is attached to the vehicle body. The engagement member 31, which has an L-shaped cross-sectional configuration, is disposed closer to the thick-walled portion $17C_1$ of the rubber mount member 17C and rigidly secured to the outer peripheral surface of the mounting member 17B. The lower end portion of the engagement member 31 is bent outwardly to form an engagement portion 31A that engages a hook 33 (described later).

Reference numeral 32 denotes another engagement member that is disposed in a vertically opposing relation to the engagement member 31 that is secured to the mounting member 17B, the engagement member 32 being rigidly secured to the side surface of the upper shell 7 by means, for example, of welding. The engagement member 32, which also has an L-shaped cross-sectional configuration, is secured to the outer side surface of the upper shell 7 below the upper end face of the shell 7. The upper end portion of the engagement member 32 is bent outwardly to form an engagement portion 32A that engages a hook 33 (described later).

Reference numeral 33 denotes a hook as a retainer which retains the rubber mount member 17C in a state where the thick-walled portion $17C_1$ is compressed to a thickness which is close to the thickness of the thin-walled portion $17C_2$. The hook 33 is formed by bending a flat plate into a channel having a substantially U-shaped cross section. The hook 33 has engagement portions 33A at both ends, which disengageably engage the respective engagement portions 31A and 32A of the engagement members 31 and 32.

The suspension system according to this embodiment is not particularly different from the prior art in its basic operation.

In this embodiment, however, the engagement members 31 and 32 are provided on the mounting member 17B of the mount 17 and the upper shell 7, and the engagement portions 31A and 32A of these two engagement members 31 and 32 are engageable with the respective engagement portions 33A of the hook 33. Accordingly, if the engagement portions 33A of the hook 33 are engaged with the engagement portions 31A and 32A of the engagement members 31 and 32, the rubber mount member 17C is retained in a state where the thickness of the thick-walled portion $17C_1$ is close to that of the thin-walled portion $17C_2$.

Thus, the suspension system can be shipped as a product with the hook 33 engaged with the engagement members 31 and 32, and in a vehicle assembling factory, it can be attached to a vehicle without the need for compressing the thick-walled portion $17C_1$ of the rubber mount member 17C. Upon the completion of the mounting operation, the mount rubber 17C is compressed, as shown in FIG. 2, by the weight of the vehicle body, so that the force between the hook 33 and the engagement members 31 and 32 is canceled out, and the hook 33 can be disengaged from the engagement members 31 and 32 with ease.

If the hook 33 is formed so that the length between the engagement portions 33A is a little longer than the spacing between the engagement portions 31A and 32A of the two engagement members 31 and 32 when the suspension system is attached to the vehicle (see FIG. 2), the hook 33 can be disengaged from the engagement members 31 and 32 even more easily.

Accordingly, it is possible to eliminate the need for the operation of compressing the thick-walled portion $17C_1$ of the rubber mount member 17C as in the prior art, when the suspension system is mounted to the vehicle, whereby the operating efficiency, safety and productivity are improved.

Figure 4:
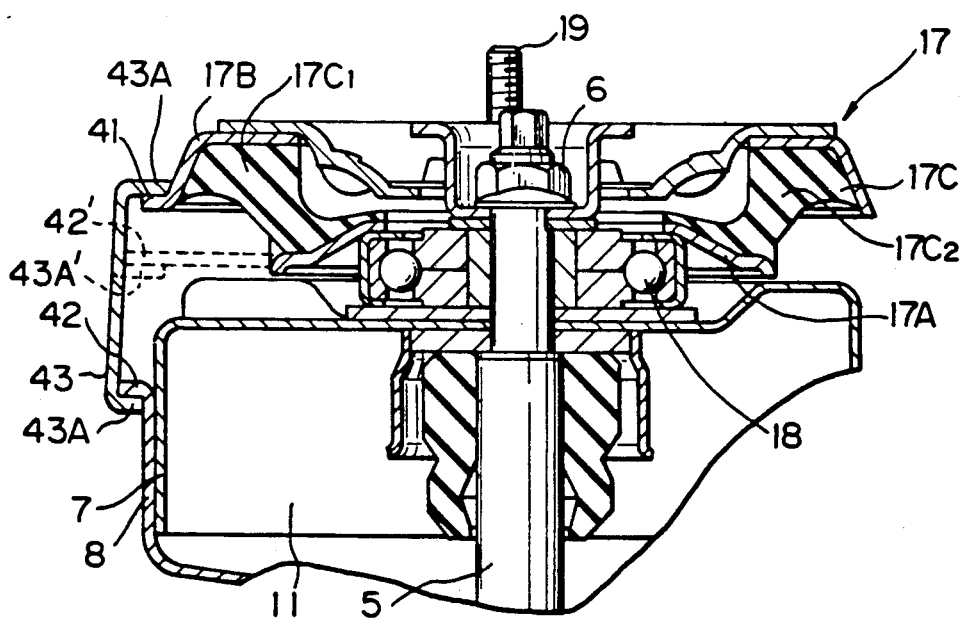
FIG. 4 is a fragmentary sectional view, which is similar to FIG. 3, showing a second embodiment of the present invention.

FIG. 4 shows a second embodiment of the present invention. The novel feature of this embodiment resides in that engagement members are respectively formed on the vehicle body-side mounting member of the mount and the lower shell as integral parts thereof. It should be noted that in this embodiment the same constituent elements as those in the first embodiment are denoted by the same reference numerals and a detailed description thereof is omitted.

In FIG. 4, reference numeral 41 denotes an engagement portion that is integrally formed on the vehicle body-side mounting member 17B of the mount 17 at a position which is closer to the thick-wall portion $17C_1$ of the rubber mount member 17C. The engagement portion 41 is bent to extend outwardly from the lower end of the peripheral wall of the mounting member 17B. Reference numeral 42 denotes another engagement portion that is integrally formed on the lower shell 8 in a vertically opposing relation to the engagement portion 41 formed on the mounting member 17B. The engagement portion 42 is bent to extend outwardly from the upper end of the peripheral wall of the lower shell 8. Reference numeral 43 denotes a hook with a substantially U-shaped cross-sectional configuration, which is formed by bending both end portions of a plate. The hook 43 has engagement portions 43A at both ends, which disengageably engage the engagement portions 41 and 42, respectively.

This embodiment also provides substantially the same advantageous effects as those of the first embodiment.

Although in the foregoing embodiments the hook 33 or 43 is employed as a retainer, it should be noted that the present invention is not necessarily limited thereto and that a retaining means other than the hook 33 or 43 may be employed, for example, a ring of a metallic material or a cord of resin.

Although in the foregoing embodiments the present invention is applied to an air suspension, the application of the present invention is not necessarily limited thereto. It is, of course, possible to apply the present invention to a Mcpherson suspension strut in which a metallic coil spring is used as a spring means, or to the suspension cylinder of an active suspension system that performs attitude control of a vehicle body by supplying oil into a hydraulic cylinder under control. In such a case, the engagement member on the piston rod side may be formed by extending a portion 42' of the mounting member of the mount that is attached to the piston rod as shown by a dotted line in FIG. 4, so as to form a securement member which can be engaged at a portion thereof by engagement portion 43A', or it may be formed as a securement member that is attached to the piston rod.

As has been detailed above, an engagement member that is provided on a mounting member of the mount that is attached to the vehicle body and an engagement member that is provided on the piston rod are disengageably engaged with a retainer, thereby compressing the thick-walled portion of the rubber mount member to a thickness which is close to the thickness of the thin-walled portion and retaining the mount rubber in this deformed state. Accordingly, the suspension system can be attached to a vehicle without the need for the operation of compressing the thick-walled portion, and upon the completion of the mounting operation, the retainer can be removed with ease. It is therefore possible to simplify the mounting operation and hence improve the operating efficiency and reduce the time required for the operation.

Although the present invention has been described through specific terms, it should be noted that the invention is not necessarily limited to the described embodiments and that various changes and modifications may be imparted thereto without departing from the scope of the invention which is limited solely by the appended claims.

What is claimed is:

1. A suspension system comprising:
   a shock absorber body;
   a piston rod that projects upwardly from an upper end of said shock absorber body;
   a mount, provided on an end portion of said piston rod which projects from said shock absorber body, for attaching said end portion to a vehicle body, said mount including a first mounting member that is attached to said piston rod, a second mounting member that is to be attached to the vehicle body, and a rubber mount member provided between said first and said second mounting members, said rubber mount member having thick- and thin-walled diametrically opposing portions; and engagement means for disengageably receiving a retainer which will retain said thick-walled portion of said rubber mount member in a compressed state, said engagement means including engagement portions fixed relative to said second mounting member and to said piston rod, respectively.

2. A suspension system according to claim 1, and further comprising a retainer that engages the engagement portions of said engagement means and retains said thick-walled portion of said rubber mount member in a compressed state.

3. A suspension system according to claim 1, wherein said engagement means comprises engagement members each having an L-shaped cross-sectional configuration, which are rigidly secured to said mounting member of said mount and to said end portion of said piston rod, respectively, respective legs of said engagement members constituting said engagement portions.

4. A suspension system according to claim 3, and further comprising a housing defining an air chamber between said shock absorber body and said end portion of said piston rod, said housing being attached to said end portion of said piston rod, and wherein the L-shaped engagement member that is fixed relative said piston rod is rigidly secured to said housing.

5. A suspension system according to claim 3, wherein said L-shaped engagement member that is secured to said second mounting member includes a first leg that is rigidly secured to said second mounting member and a second leg which constitutes a said engagement portion and which extends substantially perpendicularly from one end of said first leg, while said L-shaped engagement member that is secured to said end portion of said piston rod includes a first leg that is rigidly secured to said end portion and a second leg which constitutes a said engagement portion and which extends substantially perpendicularly from one end of said first leg, and further comprising a retainer in the form of a hook which has engagement portions at both ends thereof which are engaged with said second legs of said engagement members, respectively.

6. A suspension system according to claim 1, and further comprising a securement member that is rigidly secured to said end portion of said piston rod, and wherein one of said engagement portions is an integral part of said second mounting member extending radially of said piston rod, and the other of said engagement portions is an integral part of said securement member extending radially of said piston rod.

7. A suspension system according to claim 6, wherein said securement member is an integral part of said first mounting member of the mount.

8. A suspension system according to claim 6, and further comprising a retainer in the form of a hook which has engagement portions at both ends thereof which are engaged with said engagement portions integral with said second mounting member and said securement member, respectively.

* * * * *